UNITED STATES PATENT OFFICE 2,572,407

PROCESS FOR MANUFACTURING PLASTIC MATERIAL OF GREAT MECHANICAL STRENGTH

Pierre Alfred Talet and Pierre Cor, Paris, France; said Talet assignor to Societe Nobel Francaise, Paris, France, a joint-stock company of France No Drawing. Application February 18, 1948, Serial No. 9,343. In France November 30, 1945

Section 1, Public Law 690, August 8, 1946
Patent expires November 30, 1965

1 Claim. (Cl. 154—90)

It has already been proposed to manufacture complex substances which are characterised by excellent mechanical properties and which comprise sheets of parallel glass threads embedded in a thermoplastic binder mainly comprising synthetic resin.

Polyvinyl acetals have been found to be particularly suitable for this kind of material which has to retain some of its thermoplasticity to permit of a subsequent forming. In this process, use is made of dilute solutions in organic solvents. It has been found that by operating in this manner, the polyvinyl acetal did not penetrate deeply into the glass fibre. Furthermore, the use of solvents involves several disadvantages: high cost of solvent recovery, inevitable loss of material, fire hazard, toxicity.

The present invention enables the above enumerated disadvantages to be eliminated and a complex to be obtained which has high mechanical characteristics and also a high resistance to chemical agents. The invention is based on the fact that aqueous solutions of polyvinyl alcohol readily impregnate glass threads which have previously been degreased and treated with a very slightly acid aqueous solution, and also elemental fibres which have been degreased or not. The impregnation is completed by superficially coating the separate threads, which are arranged parallel in sheets or joined together to form a fabric, until a dosing by weight corresponding to 25 to 90% of resin is obtained. The polyvinyl alcohol may be retained as it is or rendered insoluble by the known means: bichromate, tannin, etc., but if an excellent behaviour in water is required, it is converted into formal, true acetal, butyral or other acetal. By combining several aldehydes, mixed acetals are obtained. The addition of plasticizers is effected in the cases in which the complex is required to be very flexible.

The object of the invention comprises the following characteristics:

1. *Pretreatment of the thread.*—The degreased thread, which preferably comprises elemental fibres of a diameter smaller than or equal to $5\mu$, is subjected to the action of a solution whose pH should preferably be between 5 and 6. Too high a concentration of H+ is in some cases detrimental to the strength of the thread. The acids that may be used may be organic or inorganic.

2. *Impregnating polyvinyl alcohol.*—The polyvinyl alcohol is dissolved to a concentration which may vary from 5 to 30% according to the degree of polymerization. When very great mechanical strength is required, it is preferable to make use of products of high molecular weight. When it is required to obtain a final complex which is almost colourless, the vinyl alcohol solution is bleached before hand either by means of hypochlorites, or of hydrogen peroxide, or of any other known process for bleaching these products. If necessary, potassium bichromate may be incorporated in this solution, whereby the binder will be rendered insoluble by exposing it to light.

3. *Impregnation.*—The impregnation of the glass fibres or fabrics is preferably effected with a vinyl solution heated to 50–60° C., the operation being carried out by the well known usual method of vacuum and pressure. However, if it is not essential for the impregnation to be effected to the core, the operation may be carried out in the cold state and even at ordinary pressure.

4. *Manufacture of the sheets.*—When, starting from independent glass threads of fibres, it is desired to produce sheets of parallel threads, the impregnated threads are given an additional coat by immersing them in a polyvinyl alcohol solution. They are then wound in parallel convolutions on a drum in order to obtain sheets. The sheets may also be obtained by winding the thread on a drum and coating it with a brush, a pad, by dipping or by pouring.

When starting from glass fabrics instead of from independent threads, this additional impregnating operation may be effected in any suitable known manner.

According to the invention, it is possible moreover, both in the case of independent fibres or threads and in the case of fabrics, to replace this additional impregnation by applying (by rolling, calendering, pressing, etc.) a film of polyvinyl alcohol.

5. *Rendering insoluble.* — The sheets thus formed are then subjected to a treatment for rendering them insoluble. In the case in which the sheets are not required to have an excellent resistance to water, they are merely treated with a solution of tannin, formaldehyde or by any other usual process.

In general, the resistance to water which is required cannot be obtained by the usual means; it is necessary to convert the polyvinyl alcohol into polyvinyl acetal. For this purpose, the sheet is immersed in a bath comprising the chosen aldehyde to which is added a quantity of acid catalyst. Formals are chosen in the cases in which great mechanical strength is required and in the case in which the material is required to retain some resilience even at temperatures of about −30° C. Formals are also useful owing to their insensitivity to the action of most organic solvents.

Acetals are used when the thermoplasticity has to be comparatively high and when reaction with the solvents is not detrimental.

Finally, butyrals have the advantage of being remarkably insensitive to water and very thermoplastic. Other aldehydes: furfural, oenanthal, etc. impart properties which may sometimes be advantageous.

6. *Lamination of the sheets.*—The sheets thus formed are then pressed in moulds. In general slabs are formed in which the direction of the fibres varies by 90° between successive layers. In some cases it is useful to leave several successive layers with their fibres extending in parallel directions. However, the lamination of the sheets may also be effected by rolling or by calendering at high temperature.

Example 1

A glass thread is treated for a few minutes in a bath of acidulated water containing 0.4 cc. of sulphuric acid per litre. It is then drained and put into an evacuated oven. When a vacuum has been maintained for 30 minutes, a 10% solution of polyvinyl alcohol is supplied until all the thread is covered by the liquid, the temperature being kept between 15 and 60° C. After treating for 30 minutes, the vacuum is released and the thread dried and then wound on a drum. The sheet is then coated with an identical solution to the one which was used for the impregnating operation. The viscosity is adjusted so that the glass : resin ratio is equal to 1. The cylindrical sheet obtained is cut, after drying, along a generatrix and is immersed in the mixture:

|  | Cubic centimeters |
|---|---|
| Trioxymethylene | 200 |
| Hydrochloric acid at a density of 22° Baumé | 300 |
| Methyl alcohol | 100 | which has been made homogeneous by raising it for a few minutes to boiling point.

After having been immersed for 10 minutes, the sheet is allowed to dry at ordinary temperature, which requires about 24 hours. It is then washed in running water for 24 hours and cut into slabs of the desired size. These slabs are superposed in a mould, the direction of the fibres varying 90° from one slab to the next slab. They are pressed at 140° C. at a pressure of 20 to 100 kg. per sq. cm. After cooling, a homogeneous translucent slab is obtained which has remarkable mechanical properties.

Example 2

The operation is effected as for Example 1, but the formolizing solution comprises the mixture:

|  | Cubic centimeters |
|---|---|
| Formol at 40% concentration | 100 |
| Sulphuric acid at a density of 66° Baumé | 50 |

The sheets are immersed for 30 minutes and allowed to dry in air. They are then washed for 24 hours. After drying, the product is ready to be moulded. If a very strong resistance to water is desired, it is recommended to place the sheets in a drying oven at 100° C. for some time, before the washing is effected.

We claim:

A process for manufacturing a rigid plastic material of limited flexibility which comprises degreasing a glass fibre, treating said glass fibre with acidulated water having a pH of approximately 5 to 6, impregnating the glass fibre with a solution of polyvinyl alcohol, forming the glass fibre into a sheet, coating the sheet with an additional quanitiy of said solution of polyvinyl alcohol until said sheet contains 25 to 60% by weight of said alcohol, and immersing said sheet into a mixture of 100 parts of 40% formol and 50 parts of 66° Baumé sulfuric acid to convert the alcohol substantially completely into the acetal.

PIERRE ALFRED TALET.
PIERRE COR.

REFERENCES CITED

The following references are of record in the file of this patent:

UNITED STATES PATENTS

| Number | Name | Date |
|---|---|---|
| 2,083,628 | Zelger | June 15, 1937 |
| 2,131,024 | Cordts | Sept. 27, 1938 |
| 2,184,320 | Simpson | Dec. 26, 1939 |
| 2,249,514 | Berg | July 15, 1941 |
| 2,311,704 | Simison | Feb. 23, 1943 |
| 2,354,110 | Ford | July 18, 1944 |
| 2,363,324 | Hill | Nov. 21, 1944 |
| 2,407,483 | Ebaugh | Sept. 10, 1946 |
| 2,428,654 | Collins | Oct. 7, 1947 |
| 2,452,152 | Rooney | Oct. 26, 1948 |

FOREIGN PATENTS

| Number | Country | Date |
|---|---|---|
| 558,955 | Great Britain | Jan. 28, 1944 |